US006723438B2

(12) United States Patent
Chang et al.

(10) Patent No.: US 6,723,438 B2
(45) Date of Patent: Apr. 20, 2004

(54) SOIL RESISTANT CURABLE LAMINATE COATING

(75) Inventors: John C. Chang, New Brighton, MN (US); Irvin F. Dunsmore, Ham Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 47 days.

(21) Appl. No.: 10/062,649

(22) Filed: Jan. 31, 2002

(65) Prior Publication Data

US 2002/0150765 A1 Oct. 17, 2002

Related U.S. Application Data

(60) Provisional application No. 60/265,477, filed on Jan. 31, 2001.

(51) Int. Cl.$^7$ .................. B32B 27/36; B32B 27/38; B32B 27/40; B32B 27/42; B32B 9/04
(52) U.S. Cl. .................. 428/447; 428/413; 428/423.1; 428/446; 428/480; 428/908.8; 428/913.3; 427/402; 427/407.1; 427/385.5
(58) Field of Search .................. 427/402, 407.1, 427/384, 385.5, 386, 387; 428/413, 423.1, 446, 447, 448, 474.7, 480, 482, 500, 524, 908.8, 913.3

(56) References Cited

U.S. PATENT DOCUMENTS

| | | |
|---|---|---|
| 3,493,424 A | 2/1970 | Mohriok et al. |
| 4,351,736 A | 9/1982 | Steinberger et al. |
| 4,781,844 A | 11/1988 | Kortmann et al. |
| 4,940,503 A | 7/1990 | Lindgren et al. |
| 5,034,272 A | 7/1991 | Lindgren et al. |
| 5,073,442 A | 12/1991 | Knowlton et al. |
| 6,037,429 A | 3/2000 | Linert et al. |
| 6,346,315 B1 * | 2/2002 | Sawatsky .................. 428/201 |

FOREIGN PATENT DOCUMENTS

| | | | |
|---|---|---|---|
| CA | 2315728 | * 1/2001 | ............. C09C/3/12 |
| EP | 0 592 013 | 12/1998 | |
| EP | 0 590 693 | 3/1999 | |
| EP | 1 070 688 | 1/2001 | |
| WO | WO 97/00172 | 1/1997 | |
| WO | WO 97/26410 | 7/1997 | |
| WO | WO 99/12736 | 3/1999 | |

OTHER PUBLICATIONS

"Kirk–Othmer Encyclopedia of Chemical Technology", 3$^{rd}$ Ed. vol. 2, pp. 440–469, Wiley–Interscience, 1978.

* cited by examiner

Primary Examiner—Robert Dawson
Assistant Examiner—Michael J Feely

(57) ABSTRACT

Protective overlays comprising an at least partially cured overlay thermosettable resin and a substituted polysiloxane. Method for forming a protective overlay on a substrate to protect the substrate comprising (a) providing a substrate having at least one surface, (b) applying to at least part of the surface an overlay thermosettable resin, (c) applying to at least part of the surface a substituted polysiloxane, wherein at least a portion of the overlay thermosettable resin and at least a portion of the polysiloxane are applied to the same part of the surface and then (d) at least partially curing the overlay thermosettable resin. Decorative laminates comprising (a) a decorative inner layer having at least one decorative surface and (b) an overlay layer disposed on at least a portion of the decorative surface wherein the overlay layer comprises an at least partially cured overlay thermosettable resin and a substituted polysiloxane.

14 Claims, No Drawings

SOIL RESISTANT CURABLE LAMINATE COATING

PRIORITY CLAIM

This application claims priority to U.S. Provisional Patent Application No. 60/265,477, filed Jan. 31, 2001 which is incorporated herein by reference in its entirety.

FIELD OF THE INVENTION

This invention relates to compositions useful for providing anti-soiling properties to laminates, especially flooring and decorative surfaces.

BACKGROUND OF THE INVENTION

Laminates are gaining increasing favor as materials of construction for flooring and decorative surfaces such as counter tops. Laminates provide some resistance to soiling, abrasion and spills at a very economical cost, as compared to, for example, hardwood flooring. Typically, laminates are made from papers by impregnating the papers with resins of various kinds, assembling several resin-impregnated paper layers and consolidating the paper layers to a cured state, usually by applying heat and pressure. One or more of the paper layers can be printed with patterns for decorative purpose. Typical resins used for impregnating paper are thermoset resins such as phenolics, epoxy resins, polyesters, polyurethanes, aminoplasts such as melamine-formaldehyde resins, and the like. Laminates derived from paper impregnated with thermoset resins such as melamine-formaldehyde resins have relatively high surface energy and thus are easily subjected to soiling. Soiled laminated floors or various surfaces require frequent cleaning thoroughly with detergent. Therefore a modified laminate surface with reduced soil attraction would require much less maintenance time.

Recently, fluorochemicals have been incorporated in the overlay layers of laminates to impart added anti-soiling or easy care performance. However only a limited quantity of fluorochemicals can be employed due to phase separation and potential haze problem with the typically used melamine-formaldehyde resins. Also, fluorochemicals are fairly expensive anti-soiling agents.

There remains a need for inexpensive, effective anti-soiling agents that can be incorporated into laminates to impart improved anti-soiling properties.

SUMMARY OF THE INVENTION

The present invention provides a protective overlay, a method for forming protective overlays on substrates to protect the substrates, and decorative laminates having such overlays.

In brief summary, protective overlays of the invention comprise an at least partially cured overlay thermosettable resin and a substituted polysiloxane as described below. In brief summary, a method for forming a protective overlay on a substrate to protect the substrate comprises (a) providing a substrate having at least one surface, (b) applying to at least part of the surface an overlay thermosettable resin, (c) applying to at least part of the surface a substituted polysiloxane, wherein at least a portion of the overlay thermosettable resin and at least a portion of the polysiloxane are applied to the same part of the surface and then (d) at least partially curing the overlay thermosettable resin. In brief summary, a decorative laminate of the invention comprises (a) a decorative inner layer having at least one decorative surface and (b) an overlay layer disposed on at least a portion of the decorative surface wherein the overlay layer comprises an at least partially cured overlay thermosettable resin and a substituted polysiloxane.

According to this invention, the anti-soiling properties of laminates is improved by using substituted polysiloxane materials to coat the top protective (thermoset resin-containing) layer of a laminate or by incorporating such materials into the top protective layer of a laminate. That highly cross-linked laminate surface can be used as a protective layer due to its high resistance to abrasion and wear. Laminates of the invention can have an higher degree of anti-soil resistance and are suitable for flooring panels, table and counter tops, wall panels, kitchen cabinet, tableware, furniture and the like. The substituted polysiloxane materials used in this invention can be used at relatively high add-on levels to the resins of the laminate without imparting undesirable haze problems to the laminate.

DETAILED DESCRIPTION OF ILLUSTRATIVE EMBODIMENTS OF THE INVENTION

Thermosettable resins useful as overlay resins in this invention include thermosettable resins such as phenolics, epoxy resins, polyesters, polyurethanes, aminoplast resins such as melamine-formaldehyde resins, and the like. Amino resins are preferred due to performance and cost; melamine-formaldehyde resins are particularly preferred amino resins. Aqueous dispersions of thermoset resins are preferred to solutions of thermoset resins in organic solvents in order to minimize VOC emissions during curing.

A suitable amino resin is any material in the broad class of materials based on the reaction of formaldehyde with urea, melamine, benzoguanamine, or acetylguanamine. Such compounds are well known and described in, for example, "Kirk-Othmer Encyclopedia of Chemical Technology", 3$^{rd}$ Ed. Volume 2, pages 440–469, Wiley-Interscience, 1978. Representative examples of such compounds include methylolated melamines; benzoguanamines; acetylguanamines; methylolated ureas such as dimethylolurea, dimethylolethyleneurea, tetramethylolacetylene urea, and dimethylolpropyleneurea; dimethylol derivatives of tetrahydro-5-alkyl-S-triazone; glyoxal resins such as dimethyloldihydroxyethyleneurea (DMDHEU) and tetramethylolglycoluril; methylated derivatives of any of the foregoing; and uron resins such as N,N'-bis(methoxymethyl) uron. Methylolacrylamide and methylolmethacrylamide are also included within the class of amino resins. Structures of representative amino resin moieties are shown in Table A.

TABLE A

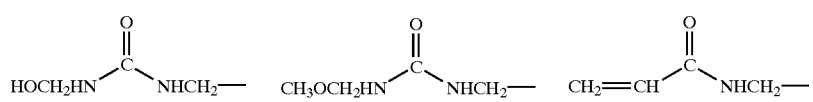

TABLE A-continued

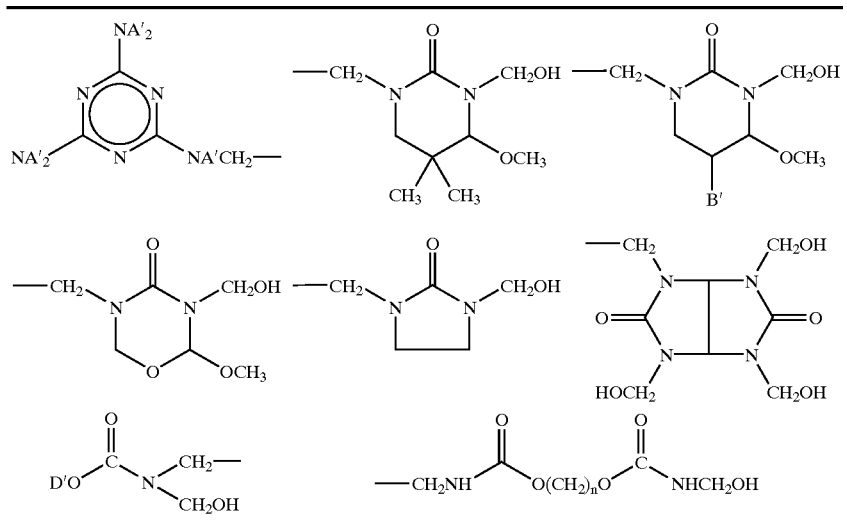

In the Table A structures, each A' moiety can be independently selected and can be a hydrogen atom, a hydroxymethyl group, or methoxymethyl group, each B' moiety can be independently selected and can be a hydrogen atom, hydroxyl group, or an alkyl group, each D' can be independently selected from the group consisting of alkyl, hydroxyalkyl, or alkoxyalkyl groups, and n is an integer from 1 to about 4. Also suitable are structures in which any or all of the hydroxymethyl or methoxymethyl groups are replaced by methylene groups. If a water soluble or water dispersible coating composition is desired, the amino resin preferably includes a plurality of hydroxymethyl groups. One such useful water dispersible amino resin is AQ 7550™ melamine-formaldehyde resin from Solutia Inc., St. Louis, Mo.

The use of urethane polyols may also be used to promote stable dispersions or solutions of otherwise water-insoluble amino resins. Useful commercially available urethanes include those sold under the K-FLEX brand by King Industries of Norwalk, Conn. Useful commercially available urethane polyols include those sold under the UD-320 and UD-350W brand by King Industries of Norwalk, Conn.

The substituted polysiloxane materials used in this invention are non-tacky solids (at room temperature) and include those with organic groups having from one to seven carbon atoms such that the substituted polysiloxanes have lower alkyls that provide an average of 0.3 to 1.5, preferably 0.5 to 1.3, carbon atoms per silicon atom.

Illustrative examples of commercially available siloxanes suitable for use in the present invention include BAYGUARD™ from Bayer Corporation, Baytown, Tex., and EPS-1926 from Kelmar Industries, Duncan, S.C.

Aqueous dispersions of lower alkyl substituted polysiloxanes of this invention can be prepared by, for instance, hydrolysis of the corresponding alkyl substituted silanes, a process well described in the literature.

In some embodiments, the substituted polysiloxane material is a polysilsesquioxane. Useful silsesquioxanes include (a) compounds having repeating units of the formula ($RSiO_{3/2}$) where R is a substituent comprising a single alkyl or aryl group or mixtures of alkyl or aryl groups of up to 7 carbon atoms, and/or (b) condensates of hydrolsylates of the formula $R_xSi(OR')_y$ where x+y is 4 and x is from 0 to 2 and y is from 2 to 4; R is a single alkyl or aryl group or mixture of alkyl or aryl groups comprising up to 7 carbon atoms, optionally substituted with halogen atoms, mercapto groups, and/or epoxy groups; and R' is an alkyl radical with 1 to 4 carbon atoms. Useful silsesquioxanes are described in U.S. Pat. Nos. 3,493,424, 4,351,736 and 4,781,844, each incorporated herein by reference in its entirety. The silsesquioxane materials can be any of the types described in U.S. Pat. Nos. 4,781,844 (Kortmann, et al), U.S. Pat. No. 4,351,736 (Steinberger et al.), U.S. Pat. No. 5,073,442 (Knowlton et al.) or U.S. Pat. No. 3,493,424 (Mohrlok et al.) each of which are incorporated herein by reference in its entirety.

The silsesquioxanes may be prepared by adding silanes to a mixture of water, a buffer, a surface active agent and optionally an organic solvent, while agitating the mixture under acidic or basic conditions. It is preferable to add the quantity of silane uniformly and slowly in order to achieve particles having an average size in the range of 300 to 1500 Angstroms. The exact amount of silane that can be added depends on the substituent R and whether an anionic, non-ionic, or cationic surface active agent is used. Examples of preferred surfactants include long chain alkyl ether sulfates which do not impart significant coloration. Some surfactants have been observed to result in yellowing of the resultant coating.

The following silanes are useful in preparing the polysiloxanes of the present invention: methyltrimethoxysilane, methyltriethoxysilane, methyltriisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, tetraethoxysilane, mercaptopropyltrimethoxysilane, and 2-ethylbutoxytriethoxysilane.

The thermosettable overlay resin and polysiloxane may be applied to the substrate separately or together in one composition. After application to the desired portions of the surface of the substrate, the thermosettable overlay resin and polysiloxane are at least partially cured.

In some decorative laminates, the laminate comprises an inner layer having at least one decorative surface. This inner layer may comprise a paper or other matrix which is printed with desired graphic designs and which is impregnated with thermosettable resin, referred to here as an "inner resin". The inner resin and thermosettable overlay resin should be compatible, i.e., capable of achieving a strong bond between the inner layer and protective overlay of the invention. In some embodiments, the inner resin and overlay resin will be the same thermosettable resin. If desired, different resins may be selected for each layer to optimize desired properties, provided, however, that the selected resins are such that the resultant layers develop a strong bond therebetween, preferably directly or with an intermediate bonding layer of adhesive or other tie layer material.

The thermosettable overlay resin may be applied to the inner layer before the inner resin has been partially cured, after the inner resin has been partially cured, or after the inner layer has been substantially completely cured, as desired and depending upon the properties of the inner resin and overlay resins selected. Typically it will be advantageous to apply the overlay resin to the inner layer after the inner resin has been partially but not completely cured.

The thermosettable overlay resin and polysiloxane may be applied together or separately in suitable solvent as desired. Common organic solvents and water are suitable solvents. Suitable curing temperatures will be easily determined by those skilled in the art based on the particular reagents and solvents being used and the particular by-products formed in the reaction, if any. While it is not practical to enumerate particular temperatures suitable for all situations, generally suitable curing temperatures are between about 80° C. and about 200° C. Reduced pressure can also be used to remove any by-products.

Optionally, catalysts are employed to facilitate curing of the thermosettable resin and/or siloxane. For example, under suitable conditions, acidic catalysts such as p-toluenesulfonic acid, sulfuric acid, or the like can be used, and certain organotitanates are useful. Preferred acid catalysts include the "blocked acid" catalysts in which an acid catalyst is coupled to a blocking agent such as an amine, which disassociates at a known, elevated temperature to provide an active catalyst. The use of such "blocked acid" catalysts permits the incorporation of the acid catalyst into the coating composition without premature curing and preparation of coating compositions having a long "shelf life". The coating composition can be prepared and stored for long periods but will not begin to cure until exposed to the elevated temperatures necessary to effect curing. Examples of such catalysts include the K-KAT, NACURE and K-CURE brand blocked acid catalysts commercially available from King Industries, Norwalk, Conn. The amount of catalyst employed in the reaction will affect the temperature at which curing will commence, however, cure temperatures are preferably about 60° C. or more. Another useful class of acid catalyst are UV activated Lewis acid catalysts which on exposure to UV light generate an acid catalyst. This class is particularly useful when coating and subsequently curing heat sensitive substrates. Such catalysts are available as UVOX brand catalysts from CIBA-Geigy.

Sufficient polysiloxane should be applied to the surface of the substrate applied in order to provide improved soil repellency. It is typically preferred for reasons of cost that the amount of substituted polysiloxane material be kept to a minimum, while still providing the coating with anti-soiling properties.

Optionally the hardness of the coating composition can be increased to impart improved abrasion resistance by the addition of hard fillers such as alpha alumina-based ceramic particles, colloidal silica, alumina powder or glass or ceramic bubbles. Preferably, such hard fillers are mixed with the substituted polysiloxane material and the thermoset table resin before cured. After curing, the coating composition and hard fillers form a composite material. Where colloidal silica is employed, a silane coupling agent can be used to curing to enhance adhesion between the reacted substituted polysiloxane material, cured thermosettable resin and hardening agent and filler.

If desired, various other optional additional ingredients known for use in coating compositions may be used. For example, pigments or dyes may be incorporated in order to provide a colored coating. Solvents, or other viscosity modifiers, may also be added to adjust the viscosity of the curable coating composition(s). Various conventional leveling agents may also be added to the coating composition. These may be useful in producing high quality coatings. Furthermore, various accelerators may be added to the compositions in order to speed the curing process. If desired, one or more fluorochemical soil and/or repellency products may be used.

A preferred substrate is decorative thermosetting laminates such as are used in covering material for walls, cupboard doors, desktops, tabletops, for other furniture and as flooring material. Such laminates are often made of two to seven craft paper sheets impregnated with phenol-formaldehyde resin, a monochromatic or patterned decor paper sheet impregnated with an amino resin, such as a melamine-formaldehyde resin, and a fine so-called overlay sheet of alpha-cellulose impregnated with an amino resin and a substituted polysiloxane material of this invention. There are also laminates consisting of a base layer of particle board or fiber board provided with such a decor paper sheet and an overlay sheet. These sheets can be laminated towards the base layer under heat and pressure.

The overlay sheet is intended to protect the decor paper sheet from abrasion. Using a composition of the invention, the decorative laminate is additionally provided with enhanced anti-soiling properties without compromising the abrasion resistance. Thus, an object of the invention is to provide a decorative laminate comprising at least one, preferably two to seven craft paper sheets impregnated with either a phenol-formaldehyde resin or an amino resin, a monochromatic or patterned decorative paper sheet impregnated with an amino resin, and a protective overlay sheet containing with the substituted polysiloxane material of this invention.

The base layer can consist of a plurality of conventional dry prepregs of continuous paper or paper sheets respectively, which need not be impregnated with the substituted polysiloxane material. The resin in the rest of the continuous papers or paper sheets preferably contain a less expensive thermosetting resin such as phenol-formaldehyde resin or phenol-urea-formaldehyde resin. The base layers are laminated continuously or discontinuously respectively with the surface layer at a high pressure and an increased temperature.

According to another embodiment of the invention the base layer can comprise particle board or fiber board, whereby the surface layer is bonded to the base layer by gluing or laminating under heat and pressure.

The surface layer often consists of a so-called overlay paper, preferably of alpha-cellulose, impregnated with the substituted polysiloxane material. However, instead it is also possible to impregnate the so-called decor paper. It is also possible to impregnate both of the overlay and decor sheets with the substituted polysiloxane. Further details regarding the preparation of decorative laminates may be found in U.S.

Pat. Nos. 4,940,503 and 5,034,272, and in published applications EP 590693, EP 592013, WO 97/00172, and WO 99/12736.

The curable overlay resin and polysiloxane composition(s) can be applied to a substrate using any conventional technique. For example, the composition can be applied onto a substrate via brushing, spraying (e.g., as an aerosol), immersing (e.g., dipping), foaming, spin-coating, knife-coating, bar-coating, kiss roll coating, etc.

The coating composition(s) can be applied to a substrate in any desired thickness. It has been found that coatings as thin as a few microns offer excellent abrasion resistance and low surface energy. However, thicker coatings (e.g., up to about 20 microns or more) can be obtained by applying a single thicker coating or by applying successive layers of the coating to the substrate. The latter can be done by applying a layer of the coating composition to the substrate and then drying without extensive curing, for example, by heating the coated substrate for about one minute at about 60° C. Successive layers of the coating can then be applied to dried, but uncured, coatings. This procedure can be repeated until the desired coating thickness is obtained and then the coated substrate is cured at elevated temperature to the desired level. It is particularly advantageous to cure the coating at elevated temperatures (i.e., greater than about 60° C.) in order to achieve the optimum anti-soiling properties.

In order to form a protective overlay that can be applied to a desired substrate, a composition comprising a thermosettable overlay resin as described above and a substituted polysiloxane as described above can be cured in desired thickness to yield an overlay, typically preferably in sheet form. The resultant overlay sheet can then be bonded to a desired article via suitable means, e.g., transparent adhesive or lamination with heat and pressure, to impart desired protection thereto.

This invention is illustrated by, but is not intended to be limited to, the following illustrative examples.

EXAMPLES

Unless specified otherwise, all percentages and parts shown in the examples and test methods that follow are assumed to be parts by weight.

Melamine resin coated overlay paper, decorated sheets (cured to B-stage), phenolic resin treated core sheets, and laminate floor panels were used in the examples (available from Dyno Overlays, Inc., Tacoma, Wash.).

The melamine-formaldehyde resin used as a thermoset resin in the examples was RESIMENE™ AQ-7550 melamine-formaldehyde resin, a 78% solids resin dispersion in water, available from Solutia, Inc., St. Louis, Mo., wherein the triazine ring is tri-substituted with a combination of —NH(CH$_2$OH) and —NH(CH$_2$OCH$_3$) groups.

The synthetic soil mixture used for all of the soiling tests in the examples was 3M Standard Carpet Dry Soil, Order No. SPS-2001, available from 3M Company, St. Paul, Minn.

A Carver Laboratory Press, Model 2625 (from Fred S. Carver, Inc., Wabash, Ind.) was utilized for lamination.

The following substituted polysiloxane materials were synthesized and later evaluated as anti-soiling treatments:

Methylsilsesquioxane Polymer Dispersion A—To a 3-L three-necked flask equipped with heater, stirrer and condenser was added 1106.0 g of deionized water and 14.0 g of linear alkylsulfonic acid (available from Alfa Aesar, Ward Hill, Mass.). The resulting mixture was heated to 60° C. with stirring until homogeneous, and 280 g of methyltrimethoxysilane (CH$_3$Si(OCH$_3$)$_3$, available from Sigma Aldrich) was slowly added to the mixture over a 4 hour period. The hydrolysis reaction was allowed to continue overnight at 60° C. with stirring. The next day the reaction mixture was monitored using gas chromatographic analysis to determine the reaction had gone to completion. Then sufficient 20% aqueous NH$_4$OH was added to adjust the pH of the mixture to 8.5. The neutralized mixture was then vacuum stripped at 50° C. to produce 530 g of distillate consisting primarily of methanol with a small amount of water and then filtered. The anionic silsesquioxane dispersion or emulsion that had formed was 10.9% solids and had an average particle diameter of approximately 80 nm, as measured using the Multi Angle Sizing option on a Zeta Plus zeta potential analyzer (available from Brookhaven Instruments Corp., Holtsville, N.Y.).

Methylsilsesquioxane Copolymer Dispersion B—To a 3-L three-necked flask equipped with heater, stirrer and condenser was added 1972.0 g of deionized water and 12.5 g of linear alkylsulfonic acid (available from Alfa Aesar). The resulting mixture was heated to 60° C. with stirring until homogeneous, and 450 g of methyltrimethoxysilane and 50.0 g of Si(OC$_2$H$_5$)$_4$ (tetraethyl orthosilicate, available from Sigma-Aldrich, Milwaukee, Wis.) were each slowly added to the mixture over a 5 hour period. The hydrolysis reaction was allowed to continue for 2 additional hours with stirring, after which time the pH of the mixture had fallen to 2.2. The reaction mixture was monitored using gas chromatographic analysis to determine the reaction had gone to completion. Sufficient aqueous NH$_4$OH was then added to adjust the pH to 7. 1200 g of the neutralized substituted polysiloxane material was then stripped at 50° C. using rotary evaporation to produce 310 g of distillate consisting primarily of ethanol with a small amount of water. The anionic emulsion of silsesquioxane that had formed was 16.8% solids and had an average particle diameter of approximately 80 nm, as measured using the Multi Angle Sizing option on a Zeta Plus zeta potential analyzer.

Methylsilsesquioxane Polymer Dispersion C—To a 3-L three-necked flask equipped with heater, stirrer and condenser was added 2958.0 g of deionized water, 82.8 g of STEOL C230 (available from Stepan Company, Northfield, Ill.) and 0.3 g of 30% of NaOH solution. The resulting mixture was heated to 60° C. with stirring until homogeneous, and 750.0 g of methyltrimethoxysilane (CH$_3$Si(OCH$_3$)$_3$, available from Sigma Aldrich, Milwaukee, Wis.) was slowly added to the mixture over a 8 hour period. During the addition of silane, another 0.3 g of 30% of NaOH solution was added in once at the end of one third of addition. The hydrolysis reaction was allowed to continue for 17 hours at 60° C. with stirring. It was then stripped using a rotovap set at 50° C. to produce 2780.0 g of dispersion. The dispersion of silsesquioxane that had formed was filtered, and determined to be 20.8% solids and had an average particle diameter of approximately 30 nm, as measured using the Multi Angle Sizing option on a Zeta Plus zeta potential analyzer.

Anti-Soiling Test Method

For each candidate, seven 2 in (5 cm)×2 in (5 cm) squares were made from the flat laminate and the squares were put in a 12 in (30 cm)×12 in (30 cm) plastic bag containing 0.5 g of 3M Standard Carpet Dry Soil, Order No. SPS-2001. The laminated squares and soil were hand-shaken in the bag for 15 seconds. Then the squares were removed from the bag and were tapped to remove loose dirt particles. After tapping, squares were visually rated for anti-soiling performance by using a Gray scale, with a rating of 1 indicating severely soiled squares and a rating of 5 indicating very clean or essentially unsoiled squares.

Example 1

A 1 ft$^2$ (930 cm$^2$) sheet of overlay paper (HAOL, 38 g/m$^2$ weight of paper, available from Dyno Overlays, Inc.) was sprayed with Methylsilsesquioxane Polymer Dispersion A (10.9% solids) using a Preval Model G210 pressurized hand sprayer (available from Precision Valve Corporation, Yonkers, N.Y.) to achieve an add-on weight of 5.11 g, or 6 g polymer solids per square meter of surface. The treated overlay sheet was dried in a horizontal orientation for 5 minutes in a 65° C. forced air oven. A 6 in (15 cm)×5 in (13 cm) coated sheet prepared as described above was put on top of a stack of sheets consisting of, from top to bottom, the HAOL overlay, decorated sheet of the same size (classic white), an overlay sheet treated with melamine (dry print film, 23 g/m$^2$ weight of paper), a core sheet treated with phenol-formaldehyde (Door Skin, DMO-581) and a second overlay sheet (dry print film, 23 g/m$^2$ weight of paper), all available from Dyno Overlays, Inc. The stack of sheets was then laminated under 660 psi (34,000 torr) for ½ minute at 180° was adhered to a 5 inch (13 cm)×6 inch (15 cm) piece of particle board of 0.25 inch (0.6 cm) thickness using 3M double-sided adhesive tape (3M Tape # 0413DL088269004, available from 3M Co.) to form a laminate assembly. The laminate assembly was then pressed at 300 psi (15,500 torr) pressure for 20 minutes at room temperature to generate a flat laminate. This flat laminate was used directly as is or was cut into 2 inch (5 cm)×2 inch (5 cm) squares for anti-soiling tests.

Example 2

The procedure for Example 2 was carried out identically to the procedure described for Example 1 except that for Example 2, only 2.55 g of the 10.9% solids dispersion of Methylsilsesquioxane Polymer Dispersion A was sprayed on the overlay. The resulting add-on level was equivalent to 3 g polymer solids per square meter of surface.

Example 3

The procedure for Example 3 was carried out identically to the procedure described for Example 2 except that for Example 3, 2.55 g of a 3.6% solids dispersion of Methylsilsesquioxane Polymer Dispersion A (diluted from 10.9%) was sprayed on the overlay. The resulting add-on level was equivalent to 1 g polymer solids per square meter of surface.

Example 4

The procedure for Example 4 was carried out identically to the procedure described for Example 2 except that for Example 4, 2.55 g of a 0.7% solids dispersion of Methylsilsesquioxane Polymer Dispersion A (diluted from 10.9%) was sprayed on the overlay. The resulting add-on level was equivalent to 0.2 g polymer solids per square meter of surface.

Comparative Example C1

The procedure for Comparative Example C1 was carried out identically to the procedure described for Example 2 except that for Comparative Example C1, no substituted polysiloxane material was used.

Anti-soiling results from Examples 1–4 and Comparative Example C1 are presented in TABLE 1 as a function of grams of Methylsilsesquioxane Polymer Dispersion A per square meter of laminate surface.

TABLE 1

| Example | g/m$^2$ of Treatment | Rating |
|---------|----------------------|--------|
| 1       | 6                    | 4      |
| 2       | 3                    | 4      |
| 3       | 1                    | 3      |
| 4       | 0.2                  | 2      |
| C1      | None                 | 2      |

The data in TABLE 1 show that increasing anti-soiling performance is achieved at higher levels of the substituted polysiloxane material.

Example 5

A 8 inch (20 cm)×12 inch (30 cm) sheet of paper weighing 34 g/m$^2$ was dip-coated with diluted RESIMENE™ AQ-7550 resin solution (at 39% solids). The wet saturated paper was then placed on a glass plate and, using a # 40 wire-wound bar, was coated on one side with Resimene™ AQ-7550 melamine-formaldehyde resin (at 78% solids) containing 0.5 % p-toluenesulfonic acid catalyst based on resin solids. Then the wet paper was placed on a glass plate and was sprayed with Methylsilsesquioxane Polymer Dispersion A (10.9% solids) using a pressurized Preval G210 hand sprayer (available from Precision Valve Corporation, Yonkers, N.Y.) to achieve a 1.70 g weight add-on. This add-on level corresponded to 3 g substituted polysiloxane material solids per square meter of surface. The treated overlay sheet was then suspended horizontally on a metal frame and dried in a forced air oven at 110° C. for 6 minutes. The dry, coated sheet was weighed and the resin add-on was calculated as 200% based on the original weight of paper. A 6 inch (15 cm)×5 inch (13 cm) coated sheet prepared as above was put on top of a decorated sheet at same size (classic white), an overlay sheet treated with melamine (dry print film, 23 g/m$^2$ weight of paper), a core sheet treated with phenol-formaldehyde (Door Skin, DMO-581) and a second overlay sheet (dry print film, 23 g/m$^2$ weight of paper), all available from Dyno Ind. Then the layer of sheets were laminated under at 660 psi (34,000 torr) pressure for ½ minute at 180° C. between two alumina foil release sheets. The resulting laminate was adhered to a 5 inch×6 inch particle board at 0.25 inch thickness using 3M double-sided adhesive tape (3M Tape # 0413DL088269004) to form a laminate assembly. The laminate assembly was then pressed at 300 psi (15,500 torr) for 20 minutes at room temperature to generate a flat specimen. Then the flat specimen was used directly or cut into 2 inch (5 cm)×2 inch (5 cm) squares for anti-soiling test.

Comparative Example C2

The procedure for Comparative Example C2 was carried out identically to the procedure described for Example 1 except that for Comparative Example C2, no substituted polysiloxane material was used.

The laminate squares were then evaluated for anti-soiling performance using the same soiling test as described for the squares tested in TABLE 1. Results are shown in TABLE 2.

TABLE 2

| Example | g/m² of Treatment | Rating |
| --- | --- | --- |
| 5 | 3 | 4 |
| C2 | None | 2 |

The data in TABLE 2 show that improved anti-soiling performance is realized when the substituted polysiloxane material is incorporated into the laminated squares.

Example 6

A 5 inch (13 cm)×6 inch (15 cm) Pergo laminate panel (Mature Pine, Planked, available from Pergo Inc., Raleigh, N.C.) was sprayed with Methylsilsesquioxane Polymer Dispersion A at 5.4% solids (diluted from 10.9% solids) using a pressurized Preval G210 hand sprayer in the same manner as described in Example 5 to achieve a 1.08 g weight add-on. This add-on level was equivalent to 3 g/m² solids. The treated panel was dried horizontally for 20 minutes in a forced air oven set at 100° C. The dried treated panel was gently rubbed and lightly polished with a slightly moist for 20 minutes towel until the panel was shining. Then the panel was used directly or cut into 2 inch (5 cm)×2 inch (5 cm) squares for anti-soiling tests.

Example 7

The procedure for Example 7 was carried out identically to the procedure described for Example 6 except that for Example 7, Methylsilsesquioxane Copolymer Dispersion B was used instead of Methylsilsesquioxane Polymer Dispersion A, and Dispersion B was applied at 5.1% solids (diluted from 16.8% solids) to achieve a 1.14 g add-on. This add-on level was equivalent to 3 g/m² solids.

Comparative Example C3

An untreated 5 inch (13 cm)×6 inch (15 cm) Pergo laminate panel (Mature Pine, Planked) was used directly or cut into 2 in (5 cm)×2 in (5 cm) squares for anti-soiling tests.

The laminate squares were then evaluated for anti-soiling performance using the same soiling test as described for the squares tested in TABLE 1. Results are shown in TABLE 3.

TABLE 3

| Example | Treatment | Rating |
| --- | --- | --- |
| 6 | Methylsilsesquioxane Polymer Dispersion A | 3.5 |
| 7 | Methylsilsesquioxane Copolymer Dispersion B | 4 |
| C3 | None | 1.5 |

The data in TABLE 3 show that improved anti-soiling performance is realized when the substituted polysiloxane material is incorporated into the laminated squares.

Example 8

This example represents a situation where the substituted polysiloxane material is added to the melamine-formaldehyde resin prior to cure. A 5 inch (13 cm)×6 inch 15 cm) laminate panel prepared as described in Example 5 (i.e., containing substituted polysiloxane material) was abraded for 200 cycles using a Gardner Laboratory Abrasion Tester from Pacific Scientific, Bethesda, Md. A 3.5 inch (8.9 cm)×1.5 inch (3.8 cm)×¾ inch (1.9 cm) piece of plywood wrapped with White Kimberly-Clark Premiere paper towels (roll, plain) were used as the abrasion pad. The laminate was used directly or cut into 2 inch (5 cm)×2 inch (5 cm) squares for anti-soiling tests.

Example 9

This example represents a situation where the substituted polysiloxane material is applied to the surface of the melamine-formaldehyde resin after cure.

A 5 inch (13 cm)×6 inch (15 cm) laminate panel prepared as described in Comparative Example C2 (i.e., no previous substituted polysiloxane treatment applied) was sprayed with Methylsilsesquioxane Polymer Dispersion A at 5.4% solids using a pressurized hand sprayer exactly same way as in Example 5 to achieve a 1.08 g weight add-on; this add-on level was equivalent to 3 g/m² solids.

The treated panel was abraded for 200 cycles using a Gardner Laboratory Abrasion Tester in the same fashion as described in Example 8. Then the laminate was used directly or cut into 2 inch×2 inch squares for anti-soiling test.

The laminate squares were then evaluated for anti-soiling performance using the same soiling test as described for the squares tested in TABLE 1. Results are shown in TABLE 4.

TABLE 4

| Example | Application of Substituted polysiloxane | Rating |
| --- | --- | --- |
| 8 | Pre-cure | 3 |
| 9 | Post-cure | 2 |

The data in TABLE 4 show that the substituted polysiloxane material imparts greater anti-soiling performance after abrasion when it is applied prior to the cure, rather than subsequent to the cure, of the melamine-formaldehyde resin.

Example 10

A 0.5 ft² (465 cm²) sheet of overlay paper (HAOL, 38 g/m² weight of paper, available from Dyno Overlays, Inc.) was coated with Methylsilsesquioxane Polymer Dispersion C (20.8% solids) using a Myer bar #40 to achieve an add-on weight of 1.32 g, or 5.90 g polymer solids per square meter of surface. The treated overlay sheet was dried in a horizontal orientation for 5 minutes in a 65° C. forced air oven. A 4 in (10 cm)×4 in (10 cm) coated sheet prepared as described above was put on top of a stack of sheets consisting of, from top to bottom, the HAOL overlay, decorated sheet of the same size (classic white), an overlay sheet treated with melamine (dry print film, 23 g/m² weight of paper), a core sheet treated with phenol-formaldehyde (Door Skin, DMO-581) and a second overlay sheet (dry print film, 23 g/m² weight of paper), all available from Dyno Overlays, Inc. The stack of sheets was then laminated under 660 psi (34,000 torr) for 4 minute at 180° C. between two aluminum foils used as release sheets. The resulting laminate was cut into 2 inch (5 cm)×2 inch (5 cm) squares for anti-soiling tests.

Comparative Example C4

The procedure for Comparative Example C4 was carried out identically to the procedure described for Example 10 except that for Comparative Example C4, only 2.2 g of the emulsion mixture at 15.0% solids made from 5 parts of Dow Corning 75 SF Emulsion, Hydrophobic Finish, 1 part of Dow Corning Catalyst 62 (both available at Dow Corning, Midland, Mich.) and 17 parts of DI water was coated on the overlay. The resulting add-on level was equivalent to 6.1 g solids per square meter of surface

13

Comparative Example C5

The procedure for Comparative Example C5 was carried out identically to the procedure described for Example 10 except that for Comparative Example C5, 1.33 g of PM-1661 (available from 3M, St Paul, Minn.) was coated on the overlay. The resulting add-on level was equivalent to 6.1 g solids per square meter of surface Comparative Example C6

Preparations of a concentrate of 25% solids by weight of MeFOSEA/AA/A-174/HPA at a ratio of 68.5/10/1.5/20

A 4-ounce narrow-mouth bottle was charged with 6.85 g of MeFOSEA ($C_8F_{17}SO_2N(CH_3)CH_2CH_2OCOCH=CH_2$; as prepared in U.S. Pat. No. 6,037,429 Linert et al.; Table 1), 1.0 g of AA (Acrylic acid, available from Sigma-Aldrich, Milwaukee, Wis.), 0.15 g of A-174 ($CH_2=C(CH_3)C(O)OCH_2CH_2CH_2Si(OCH_3)_3$; available from Union Carbid Danbury, Conn.), 2.0 g of HPA ($CH_2=CHC(O)OCH_2CH_2CH_2OH$; available from Sigma-Aldrich, Milwaukee, Wis.), 0.1 g of TBPO (t-butylperoctoate, $(CH_3)_3COOC(O)(CH_2)_6CH_3$; Atofina Chemicals, Philadelphia, Pa.), 0.1 g of 3-mercaptopropionic acid (available from Sigma-Aldrich, Milwaukee, Wis.) and 20 g of acetone. The bottle was purged with nitrogen for approximately 2 minutes, was sealed and then was heated with agitation in a water bath at 65° C. for 5 hours. After that time, the resulting polymer solution was mixed with 2.91 g DEMA (($HOCH_2CH_2)_2N(CH_3)$; available from Sigma-Aldrich, Milwaukee, Wis.) in 39 g deionized water. The neutralized polymer solution was distilled at a pressure of approximately 300 mm Hg (40 kPa) at 40–55° C. to remove acetone.

The procedure for Comparative Example C6 was carried out identically to the procedure described for Example 10 except that for Comparative Example C6, only 1.59 g of MeFOSEA/AA/A-174/HPA at a ratio of 68.5/10/1.5/20, as prepared above, diluted to 20% solids was coated on the overlay. The resulting add-on level was equivalent to 5.9 g solids per square meter of surface Comparative Example C7

The procedure for Comparative Example C7 was carried out identically to the procedure described for Example 10 except that for Comparative Example C7, no material was coated on the overlay.

The results of anti-soiling testing of Example 10 and Comparative Example C4–C7 are presented in TABLE 5.

TABLE 5

| Example | g/m² of Treatment | Rating |
|---------|-------------------|--------|
| 10      | 6                 | 4      |
| C4      | 6                 | 1      |
| C5      | 6                 | 3      |
| C6      | 6                 | 4      |
| C7      | None              | 2      |

Various modifications and alterations of this invention will become apparent to those skilled in the art without departing from the scope and spirit of this invention.

What is claimed is:

1. A method for protecting a substrate comprising (a) providing a substrate having at least one surface, (b) applying to at least part of said surface an overlay thermosettable resin, (c) applying to at least part of said surface a polysiloxane substituted with organic groups having from one to seven carbon atoms such that the polysiloxane has an average of 0.3 to 1.5 carbon atoms per silicon atom, wherein at least a portion of said overlay thermosettable resin and at least a portion of said polysiloxane are applied to the same part of said surface and then (d) at least partially curing said overlay thermosettable resin.

2. The method of claim 1 wherein said overlay thermosettable resin and said polysiloxane are applied to said surface simultaneously.

3. The method of claim 1 wherein said overlay thermosettable resin and said polysiloxane are applied to said surface separately.

4. The method of claim 1 wherein said polysiloxane comprises (a) a polysilsesquioxane having repeating units of the formula

($RSiO_{3/2}$)

wherein R is a single group or mixture of substituted or unsubstituted alkyl or aryl groups having from one to seven carbon atoms; or (b) condensates of hydrolsylates of the formula $R_xSi(OR')_y$ wherein x+y is 4 and x is from 0 to 2 and y is from 2 to 4; R is a single alkyl or aryl group or mixture of alkyl or aryl groups comprising up to 7 carbon atoms, optionally substituted with halogen atoms, mercapto groups, and/or epoxy groups; and R' is an alkyl radical with 1 to 4 carbon atoms.

5. The method of claim 1 wherein said overlay thermoset resin comprises at least one resin selected from the group consisting of phenolics, epoxies, polyesters, polyurethanes, and aminoplasts.

6. The method of claim 1 wherein said substrate comprises a decorative inner layer having at least one decorative surface and said overlay thermosettable resin and said polysiloxane are applied to at least a portion of said decorative surface.

7. The method of claim 6 wherein said decorative inner layer comprises a thermosettable resin that is compatible with said overlay thermosettable resin.

8. A protective overlay comprising an at least partially cured overlay thermosettable resin and a polysiloxane substituted with organic groups having from one to eight carbon atoms such that the polysiloxane has an average of 0.3 to 1.5 carbon atoms per silicon atom.

9. The overlay claim 8 wherein said polysiloxane comprises (a) a polysilsesquioxane having repeating units of the formula

($RSiO_{3/2}$)

wherein R is a single group or mixture of substituted or unsubstituted alkyl or aryl groups having from one to seven carbon atoms; or (b) condensates of hydrolsylates of the formula $R_xSi(OR')_y$ wherein x+y is 4 and x is from 0 to 2 and y is from 2 to 4; R is a single alkyl or aryl group or mixture of alkyl or aryl groups comprising up to 7 carbon atoms, optionally substituted with halogen atoms, mercapto groups, and/or epoxy groups; and R' is an alkyl radical with 1 to 4 carbon atoms.

10. The overlay of claim 8 wherein said overlay thermoset resin comprises at least one resin selected from the group consisting of phenolics, epoxies, polyesters, polyurethanes, and aminoplasts.

11. A decorative laminate comprising (a) a decorative inner layer having at least one decorative surface and (b) an overlay layer disposed on at least a portion of said decorative surface wherein said overlay comprises an at least partially cured overlay thermosettable resin and a polysiloxane substituted with organic groups having from one to eight carbon atoms such that the polysiloxane has an average of 0.3 to 1.5 carbon atoms per silicon atom.

12. The laminate of claim 11 wherein said polysiloxane comprises (a) a polysilsesquioxane having repeating units of the formula

$(RSiO_{3/2})$ wherein R is a single group or mixture of substituted or unsubstituted alkyl or aryl groups having from one to seven carbon atoms; or (b) condensates of hydrolsylates of the formula $R_xSi(OR')_y$ wherein x+y is 4 and x is from 0 to 2 and y is from 2 to 4; R is a single alkyl or aryl group or mixture of alkyl or aryl groups comprising up to 7 carbon atoms, optionally substituted with halogen atoms, mercapto groups, and/or epoxy groups; and R' is an alkyl radical with 1 to 4 carbon atoms.

13. The laminate of claim 11 wherein said overlay thermoset resin comprises at least one resin selected from the group consisting of phenolics, epoxies, polyesters, polyurethanes, and aminoplasts.

14. The laminate of claim 11 wherein said decorative inner layer comprises a thermoset resin that is compatible with said overlay thermosettable resin.

* * * * *

UNITED STATES PATENT AND TRADEMARK OFFICE
CERTIFICATE OF CORRECTION

PATENT NO. : 6,723,438 B2
DATED : April 20, 2004
INVENTOR(S) : Chang, John C.

It is certified that error appears in the above-identified patent and that said Letters Patent is hereby corrected as shown below:

<u>Title page,</u>
Item [56], References Cited, U.S. PATENT DOCUMENTS, delete "Mohriok" and insert -- Mohrlok --, therefor.

<u>Column 3,</u>
Line 66, delete "hydrolsylates" and insert -- hydrosylates --, therefor.

<u>Column 9,</u>
Line 24, after "180°" insert -- C between two alumina foils used as release sheets. The resulting laminate --.

<u>Column 12,</u>
Line 64, delete "Coming" and insert -- Corning --, therefor.
Line 67, after "surface" insert -- . --.

<u>Column 13,</u>
Line 8, after "surface" insert -- . --.
Line 12, after "20" insert -- . --.
Line 14, delete "($CsF_{17}SO_2N$" and insert -- ($C_8F_{17}SO_2N$ --, therefor.
Line 19, delete "Carbid" and insert -- Carbide --, therefor.
Line 40, after "surface" insert -- . --.

<u>Column 14,</u>
Lines 22 and 55, delete "hydrolsylates" and insert -- hydrosylates --, therefor.

<u>Column 16,</u>
Line 1, delete "hydrolsylates" and insert -- hydrosylates --, therefor.

Signed and Sealed this

Eighteenth Day of January, 2005

JON W. DUDAS
*Director of the United States Patent and Trademark Office*